Dec. 10, 1968   F. A. BURNE ET AL   3,415,316
MODULAR UNITS AND USE THEREOF IN HEAT EXCHANGERS
Filed April 11, 1967   4 Sheets-Sheet 1

INVENTORS
FREDERICK A. BURNE
EMERY I. VALYI
BY Henry W. Cummings
ATTORNEY

INVENTORS:
FREDERICK A. BURNE
EMERY I. VALYI

BY Henry W. Cummings

ATTORNEY

Dec. 10, 1968    F. A. BURNE ET AL    3,415,316
MODULAR UNITS AND USE THEREOF IN HEAT EXCHANGERS
Filed April 11, 1967    4 Sheets-Sheet 3

INVENTORS.
FREDERICK A. BURNE
EMERY I. VALYI

BY Henry W. Cummings
ATTORNEY

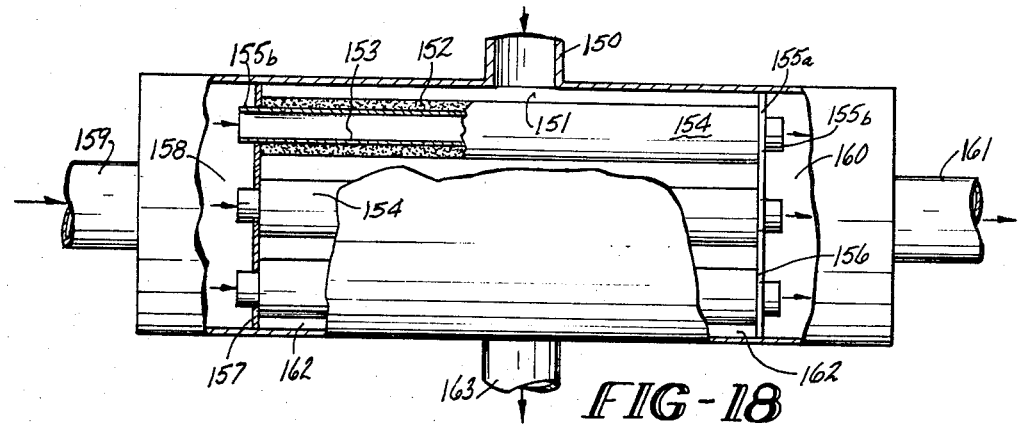
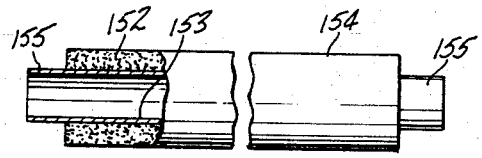
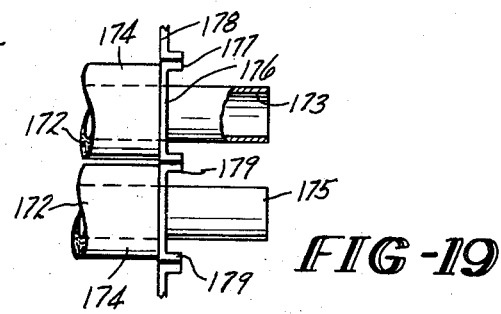
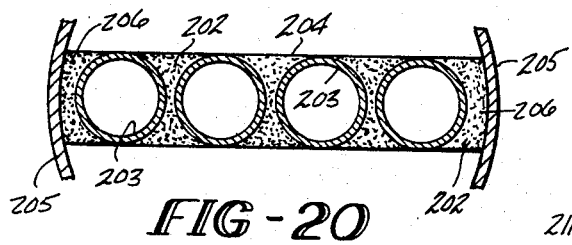
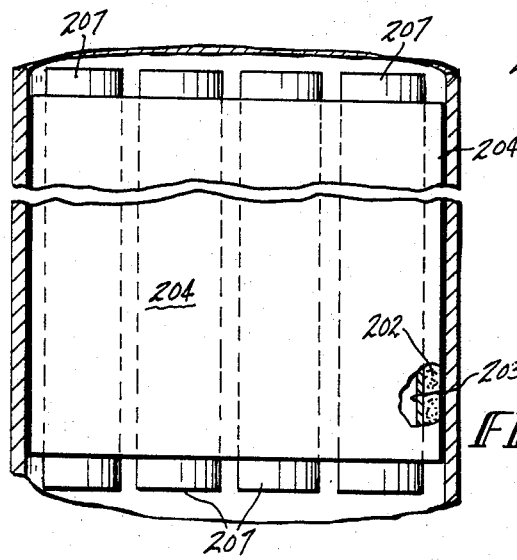
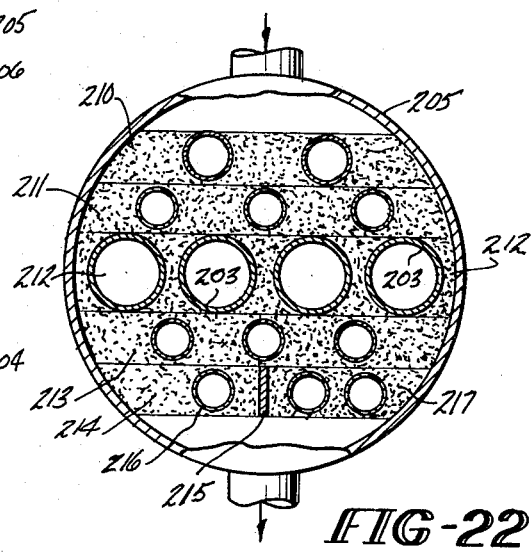
INVENTORS.
FREDERICK A. BURNE
EMERY I. VALYI
BY Henry W. Cummings
ATTORNEY

United States Patent Office 3,415,316
Patented Dec. 10, 1968

3,415,316
MODULAR UNITS AND USE THEREOF IN HEAT EXCHANGERS
Frederick A. Burne, Hamden, Conn., and Emery I. Valyi, Riverdale, N.Y., assignors to Olin Mathieson Chemical Corporation, a corporation of Virginia
Filed Apr. 11, 1967, Ser. No. 629,954
13 Claims. (Cl. 165—164)

ABSTRACT OF THE DISCLOSURE

A heat exchange unit and a method of exchanging heat is provided utilizing a tube for conducting a heat exchange medium therethrough, heat conductively bonded to a layer of pervious material. The contour of these units is such that they can be fitted together and assembled to form heat exchangers of any desired size and length which avoid substantial by-pass.

---

This invention relates to heat exchangers and in particular relates to modular heat exchange units and the use thereof comprising tubes conductively bonded to a layer of pervious material, the layer of pervious material being so contoured as to engage other such members to form heat exchangers of any desired size and length.

Figure 15:
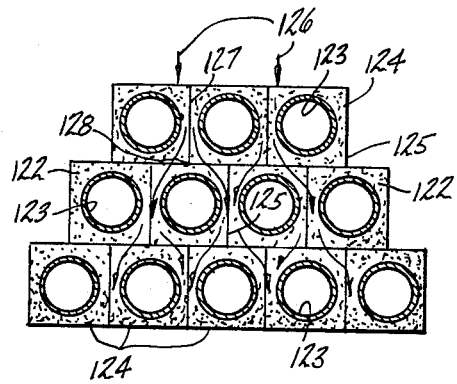
FIGURE 15 is a sectional view of a modular unit according to the present invention illustrating an improved geometric arrangement.
Figure 15A:
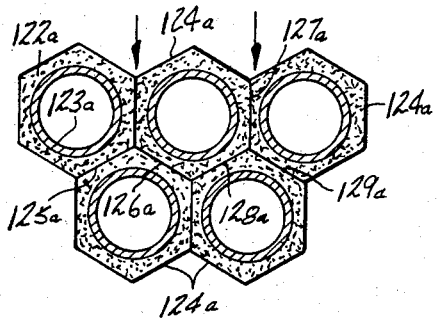
Figure 15B:
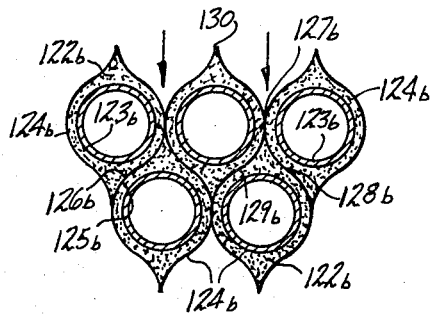

FIGURES 15(a) and 15(b) are sectional views of the modular units illustrating another geometric arrangement of the units.

Figure 16:
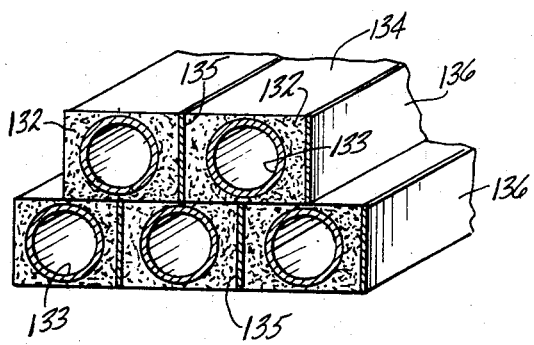

FIGURE 16 is a sectional view of the modular units according to the present invention illustrating a favorable geometric arrangement of units together with the use of sealing strips between the units.

FIGURE 17 is a sectional view of a modular unit of the present invention having an extended tube portion for engagement with header plates.

FIGURE 18 is a sectional view of a heat exchanger in which the modular units according to FIGURE 17 are assembled in header plates.

FIGURE 19 is a partial sectional view of the modular units of the present invention provided with a drawn cup.

FIGURE 20 is a sectional view of a multi-tube unit according to the present invention.

FIGURE 21 is a top view of the multi-tube unit in FIGURE 20.

FIGURE 22 is a sectional view of a heat exchanger in which the multi-tube units of the present invention are shown in various embodiments.

It is an object of this invention to provide a heat exchanger made up of units comprising tubes conductively bonded to a layer of porous material.

It is another object of this invention to provide heat exchange units which can be used in either large or small heat exchangers.

It is another object of this invention to provide heat exchange units comprising tubes conductively bonded to a layer of porous material, the size of the units being such that uniform brazing can be obtained throughout the entire layer of porous material in the units.

It is another object of the present invention to provide a method of exchanging heat in which one fluid is to pass through tubes and another heat exchange medium is to pass through a porous material conductively bonded to the tubes and in which there is no substantial by-pass of the heat exchange fluid which is to pass through the porous material.

It is another object of this invention to provide heat exchange units which can be brazed without the use of an unduly large furnace.

It is another object of the present invention to control the path of the heat exchange fluid passing through the porous material to minimize by-pass.

It is another object of the present invention to provide a heat exchange core made up of the heat exchange units of the present invention.

Other objects will appear from the following description and drawings.

In U.S. Patent 3,289,750, assigned to the assignee of the present application, heat exchange structures are described consisting of a heat-conductively bonded composite of solid and pervious metal, wherein the heating or cooling fluid is separated from the substance to be heated or cooled by an impervious barrier. Such structures have been shown to be very effective in heat transfer applications.

Figure 1:
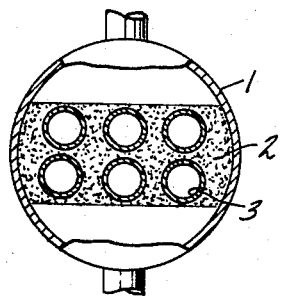
FIGURE 1 is a schematic sectional view of a heat exchanger according to the prior art.

FIGURE 1 shows schematically one of such heat exchangers, very successfully produced in which a shell 1 contains a core 2 consisting of permeable metal containing tubes 3 embedded therein. Such heat exchangers are very efficient when designed within certain known dimensional limits.

Such heat exchangers are usually made by first preparing a solid metal assembly and filling it with particulate metal of a desired size, together with a still finer brazing metal or alloy. A brazing operation follows which joins the entire structure together. In general, the resulting brazed structure contains metal particles, for example, spherically shaped, joined by brazing. It is desired to have relatively large brazed joints to provide for good heat conduction between the metal particles. This can only be obtained if the time at brazing temperature is not too long (for example, for a phosphorus containing copper brazing alloy, less than 5 minutes at 1600° F.). Long times (e.g., more than 15 minutes at 1600° F. for this brazing alloy) result in diffusion of the brazing alloy into the particulate metal particles and a corresponding reduction in the size of the remaining joint area. The particular temperatures and times vary with the particular brazing alloy, but the principle is the same. The reduced area of the brazed joints results in lower heat conductance through them between adjoining metal particles.

The designs and schemes disclosed to date are limited to structures including an entire unit, or a core which needs only to have the shell added for completion. The entire unit or the core must usually be small because, in the course of brazing, the center as well as the surface of the porous layer must reach brazing temperature, all within less time than it takes for harmful loss of brazing material to occur, lest undue loss of heat conductance from one metal particle to the other results.

Size of such a one-piece unit is also limited by the brazing furnace. Considerations including atmosphere penetration, heat penetration and total heat requirement limit the size. One of the three linear dimensions of the one-piece units should not exceed 3 to 4 inches as a practical value. Beyond this, the atmosphere does not penetrate. Weight per piece should not be too great because an excessively long time to heat to brazing temperature would be required or an execessively large furnace would be required. As mentioned previously, if the weight or dimensions of the unit are excessive, the time in the furance is such that the exterior of the unit is at brazing temperature for too long a time while the interior or center is rising to brazing temperature. This reduces the cross sectional area of the brazed bond near the surface and thus causes a reduction in heat conduction at that location.

The present concept solves the inherent problems encountered in attempting to apply one-piece units to applications in large heat exchangers.

Figure 2:
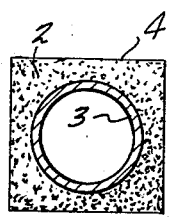
FIGURE 2 is a sectional view of the modular units according to the present invention.

According to the present invention, units 4 are produced containing tubes 3 of desired lengths conductively bonded to a layer of porous material 2, as shown in FIGURE 2. Such elements 4 can be readily manufactured in practically unlimited length. For a single unit, the porous layer 2 which is perpendicular to the direction of flow of the fluid passing through the porous material (vertically downward in FIGURE 3) is designed to effect an acceptable compromise of good heat transfer and low pressure drop. While the thickness of the porous layer will vary from one application to another, a thickness of 0.05 to 0.1 inch has been found effective in many instances.

Figure 3:
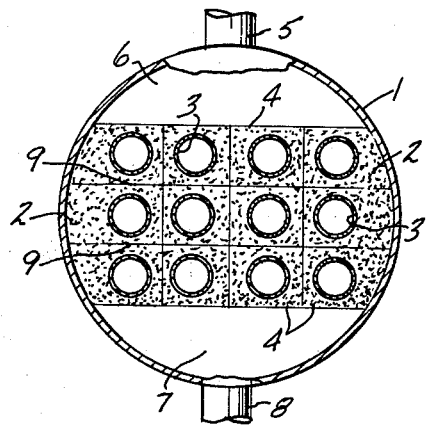
FIGURE 3 is a sectional view of the modular units shown in FIGURE 2 assembled into a heat exchanger.

The units thus formed may then be mechanically assembled in a predetermined pattern and put into a heat exchanger of any size, such as the one shown schematically in FIGURE 3. The result would thus be geometrically similar to the structure of FIGURE 1.

Thus, in the exemplary embodiment of the present invention in FIGURE 3, one fluid will enter through conduit 5, pass into the void space 6, and will then penetrate and flow through the porous material 2 as it passes downwardly through the plurality of assembled units 4. While this fluid is in contact with the porous material 2, a second fluid, passing through the tubes 3, will be in heat exchange relation with the first fluid throughout the porous material. The first heat exchange medium will then be collected in the void space 7 and pass out at 8.

It is seen that with this arrangement intimate contact is obtained between the first heat exchange medium which enters at 5 and the porous material 2 and that substantially all of the first heat exchange fluid is in heat exchange relation with the pervious material 4.

To function well, substantial flow of fluid outside the porous material must be avoided in the assembled units. Thus, by-pass may occur between these units at a resistance to flow which is less than the one within the porous layer. Then, a substantial portion of the fluid will participate in heat exchange to a greatly reduced extent. Provision therefore must be made to assure that substantially all of the heat exchange fluid which enters the shell 1 will be in heat exchange relation with porous material 2 by virtue of being forced to flow through that material.

These modules, either single or multiple tubes, can be made in long, continuous lengths of standard sizes. Lengths of up to 20 feet may be produced if desired. The tubes with the porous extended surface may then be used in making either large or small heat exchangers, in a similar manner to that in which bare tube or finned tubing is presently used.

The heat exchange units 4 can be made in practically any desired length because the thickness of the porous layer is such that it will fit into existing furnaces and can be effectively brazed therein. It is not difficult to braze effectively at the center, as well as at the edge of the porous material.

Thus, it is seen that formation of the tubes 3 and porous layer 2 through the use of the modular units 4 has considerable advantage from the standpoint of flexibility of size of heat exchangers which can be produced over the construction shown in FIGURE 1, which is limited to a size, as before explained.

Figure 3A:
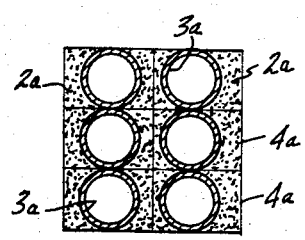
FIGURE 3(a) is a sectional view illustrating the modular units with a tangential design of the tubes in the units.

It can be seen from FIGURE 3 that there is a space 9 between the tubes 3 filled with porous material 2. The heat exchange medium which is passing vertically downward through the porous material will not pass through the space 9 except to a very limited extent, and little heat will be exchanged therein. Thus, this space 9 constitutes inefficient use of the porous material 2. Thus, an improved unit is shown in FIGURE 3(a) in which the tubes 3a extend to the surface of the units. It is apparent that, in an assembly, this design of the units avoids the inefficient space 9 shown in FIGURE 3.

Figure 4:
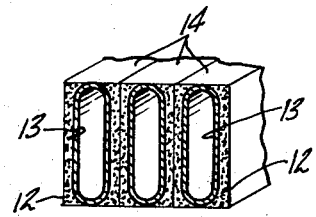
FIGURE 4 is a sectional view of the modular units according to the present invention with the tubes having an elliptical cross section.

The tubes may have any desired cross section. For instance, the units 14 shown in FIGURE 4 contain tubes 13 having elliptical cross sections within the pervious material 12.

Figure 5:
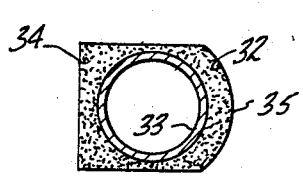
FIGURE 5 is a sectional view of a modular unit according to the present invention in which the contour of the modular unit is designed to fit adjacent a shell when the heat exchanger is assembled.
Figure 6:
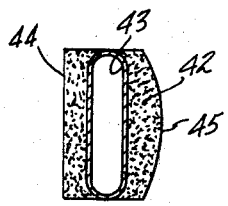
FIGURE 6 is a sectional view of a modular unit according to the present invention designed to fit adjacent a shell wherein the tubes have an elliptical cross section.

To avoid by-pass, the units which are to be placed against the shell wall 1 are preferably contoured. Thus, in FIGURE 5, in the unit 34 having circular tubes 33, the porous material is contoured at 35 to fit against a shell such as 1 in FIGURE 3. Likewise, the unit 44 in FIGURE 6 having elliptical tubes 43 is contoured at 45 to fit against such a shell. FIGURE 6 also shows the tangential design of the units 44, with the elliptical tubes 43 extending to the surface of the unit 44.

Figure 7A:
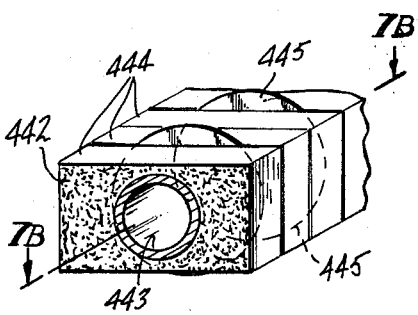
FIGURE 7(a) is a sectional view of a modular unit according to the present invention provided with fins in the layer of porous material.
Figure 7B:
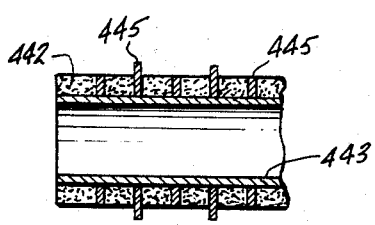
FIGURE 7(b) is a sectional view along the lines 7b of FIGURE 7(a).

In another embodiment of the invention shown in FIGURES 7(a) and 7(b), the units 444 have tubes 443. Bonded to the tubes 443 is pervious material 442. However, the tubes 443 also have fin members 445. These fin members 445 are conductively bonded to the pervious material 442 and to the tubes 443. The fins 445 may be placed below the surface of the porous material, or they may extend to the surface or above the surface, as desired. This embodiment is more efficient in heat transfer due to the combined effects of the porous material 442 and the fins 445.

In making the mechanical joint between units, it is often difficult to avoid a small amount of by-pass between abutting surfaces of adjoining elements. In whatever joint such by-pass became readily possible, the heat exchange medium would preferably pass through it, rather than through the porous body itself because this joint would offer less resistance to flow.

Thus, for an even more efficient heat exchange, it is desirable to provide structures which minimize and/or eliminate such by-pass.

Figure 8:
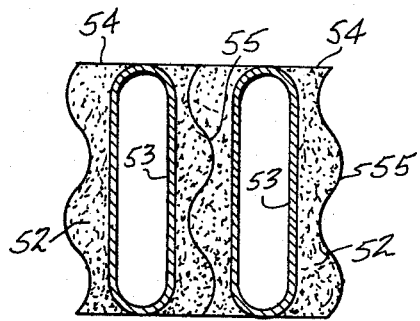
FIGURE 8 is a sectional view of modular units according to the present invention having a cooperating contour.

One method of reducing by-pass is the provision of contours on the units which fit together and interlock. Thus, as shown in FIGURE 8, the units 54 comprising tubes 53 and pervious material 52 have a cooperating contour as shown at 55.

Figure 9A:
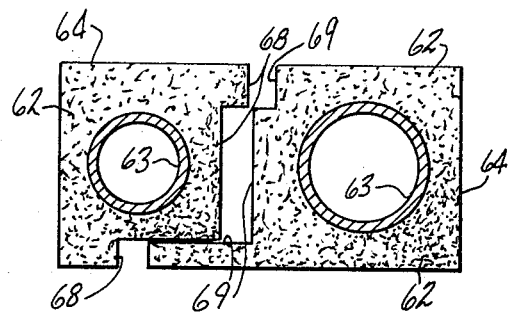
FIGURE 9(a) is a sectional view of modular units according to the present invention showing another cooperating contour.

In the embodiment shown in FIGURE 9(a), the units 64 comprising tubes 63 and pervious material 62, have interlocking contours shown at 68 and 69. These two contours cooperate to reduce by-pass.

Figure 9B:
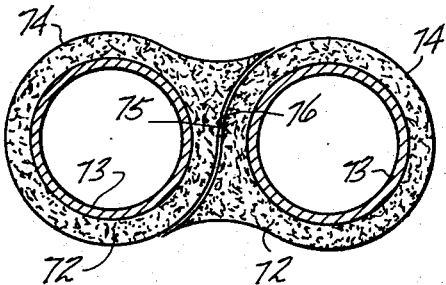
FIGURE 9(b) is a sectional view of modular units according to the present invention showing still another cooperating contour.

Still another exemplary embodiment is shown in FIGURE 9(b) in which the units 74, including tubes 73 and pervious material sections 72, have interlocking S-shaped contours 75 and 76.

It will be understood that the preceding geometric arrangements may be varied according to manufacturing considerations which provide cross-sections which are easy to fabricate and still satisfy the need of reducing by-pass.

Another method of eliminating or reducing by-pass and thereby insuring that essentially all of the heat exchange fluid flows through the porous matrix is the use of sealants, examples of which include plastic tape, shaped extrusions, mastic tape, rubber sheets, cements, side plates, etc., between adjacent modular surfaces.

Thus, in another embodiment of the invention, each element may be provided with a sealing layer at all places along which by-pass is to be prevented. Such a sealing layer may consist of thin gage soft metal or, if temperatures at which the heat exchanger is to be used permit, preferably of a plastic film, either of which may be provided with a contact adhesive layer for easier application. Thus, a roll of the sealing material may be provided in the manner of a conventional adhesive strip roll. The requisite amount of sealing strip may then be attached to the element immediately prior to assembly. Alternately, the elements may be so equipped in the course of manufacture, thereby assuring that the right orientation in assembly is observed.

Figure 10:
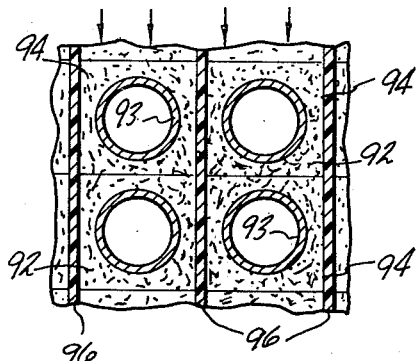
FIGURE 10 is a sectional view of the modular units according to the present invention wherein sealing strips are provided between the units to reduce by-pass.

In the embodiment shown in FIGURE 10, the units 94 having tubes 93 and pervious material 92, are separated by sealing strips 96. These strips, for example, may be attached to units 94 by means of an adhesive such as glue or paste or the like. The sealing strips 96 may, for example, be made of plastic.

Figure 11:
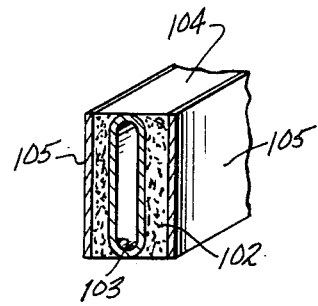
FIGURE 11 is a sectional view of a unit according to the present invention provided with side plates to reduce by-pass.

Alternately, if a higher temperature operational unit is to be used, as shown in FIGURE 11, the units 104 having pervious material 102 conductively bonded to the tubes 103 may have metallic side plates 105 attached to the pervious material 102. These metallic side plates, for example, may be brazed to the pervious material 102.

Figure 12:
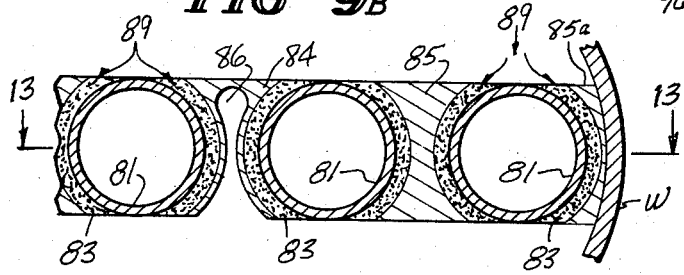
FIGURE 12 is a sectional view of the modular units according to the present invention provided with inserts to reduce by-pass.
Figure 13:
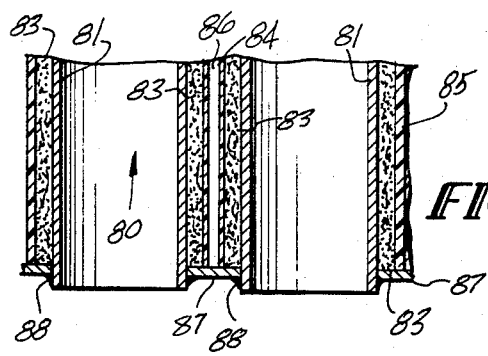
FIGURE 13 is a sectional view along the line 13—13 in FIGURE 12.

In the embodiments of the invention shown in FIGURES 12 and 13, the tubes 81 are embedded in porous material 83 and so bonded as to provide heat transfer and conductance from one to the other. A series of such tubes are then placed in tube headers 87 and sealed conventionally at 88. Inserts made of plastic or metal 84 and 85 are placed between the tubes 81, thus forcing fluid flow in direction of arrow 89 to flow as indicated by arrows 89(a). The second fluid flows inside the tubes in direction of arrow 80.

Flow of the two fluids in this structure may be arranged so as to be parallel, in series, or in series and parallel, depending on the designer's choice.

Open inserts 84 having void space 86, or closed inserts 85 may be used. Seals 85(a) similar to 84 and 85 may be used between end tubes 81(a) and the inner shell wall W.

The porous layer may surround the tubes fully or partially, so long as the inserts are formed to provide flow through the entire porous layer.

Figure 14:
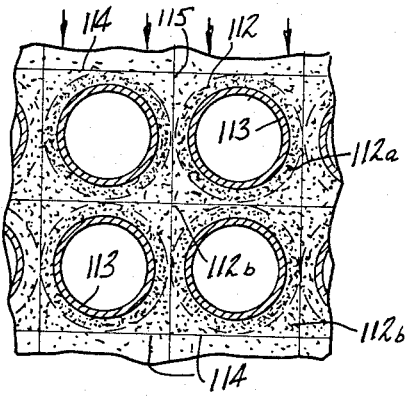
FIGURE 14 is a sectional view of the modular units according to the present invention illustrating one geometric arrangement of the units.

In FIGURE 14 four units 114 are shown having tubes 113 and pervious material 112. The portions 112a of the pervious material next to the tubes are in very effective heat exchange relationship with the tubes, while portions 112b are in less effective heat exchange relation, because the effectiveness of the porous material at any point is inversely proportional to its distance from the tubes 113. Moreover, in the pattern shown, there is an opportunity for fluid flowing in the direction of the arrows to by-pass the pervious material 112 between the units 114 along the abutting line 115.

In order to avoid these drawbacks of the arrangement of FIGURE 14, the geometric arrangement shown in FIGURE 15 may be preferred in which the units 124 are staggered, as for example when the edges 125 of units 124 are in line with tubes 123, with the path of heat exchange medium through the pervious material 122 shown by the arrows 126. It is apparent that, in this embodiment of the invention, the opportunity for fluid to by-pass between the units is reduced, by forcing the fluid through a tortuous abutting path. Instead of following the sharp curve 128, the heat exchange medium passing through the abutting void 127 will pass into the porous medium 122 in heat exchange relation with tubes 123.

Additionally, for even more efficient heat exchange, the embodiment shown in FIGURES 15a and 15b may be utilized. Thus, in FIGURE 15a, the units 124a made of porous material 122a conductively bonded to tubes 123a are nested by their cooperating contours 125a and 126a. It is apparent that with this nesting arrangement, the distance between the interface of the units and the tubes 123a is less than in the case of either FIGURE 14 or 15. Since heat exchange is inversely proportional to the distance from any point in the porous media to the tubes, it is apparent that arrangement is more efficient than that shown in either FIGURE 14 or 15.

This nesting arrangement also provides the advantage of FIGURE 15 in that a heat exchange medium passing through the abutting void 127a must again follow a tortuous curve 128a or 129a in order to remain in the abutting void. Rather than do this, the heat exchange medium will preferably pass through the porous layer 122a and thus be in heat exchange relation therein with the tubes 123a.

The embodiment shown in FIGURE 15b is basically the same as that shown in FIGURE 15a except that the contours 125b and 126b are shaped differently. As was the case in FIGURE 15a, the distance from the interface to the tubes 123b is less in this embodiment than in the embodiments shown in FIGURES 14 and 15, except for possibly at the cooperating points 130. Furthermore, a heat exchange medium passing through the abutting void 127b will preferably pass into the porous layer 122b in preference to the tortuous abutting void paths 128b and 129b.

Thus, the embodiments shown in FIGURES 15a and 15b provide the advantage of both staggering and nesting.

The staggered arrangement may be combined with the previously described embodiment directed to the use of inserts or sealing strips between the units. Thus, in the embodiment shown in FIGURE 16, the units 134 comprising tubes 133 conductively bonded to pervious material 132. These units 134 are separated by sealing strips 135. Furthermore, the rows 136 of the units 134 spaced apart by inserts 135 are in a staggered relationship with the center of the sealing strip 135 of one row being in line with the center of the tube 133 of the row above it. Thus, by-pass is held to a particularly low level in this embodiment since both the sealing strips and the staggered configuration act to reduce by-pass.

As shown in FIGURE 17, the units 154 may have tubes 153 with an extended portion 155 beyond the pervious material 152 adapted to engage header plates or end plates.

Thus, in FIGURE 18, which is a sectional view of an exemplary heat exchanger, the extended portions 155 may engage the plates 156 and 157 at 155a and may extend beyond the plates, as shown at 155b.

A fluid to be heated or cooled may enter through conduit 150 and pass into void space 151. It then passes through the pervious material portion 152 which surrounds the tubes 153 in the units 154. A second heat exchange fluid enters void space 158 from conduit 159. The second heat exchange fluid will pass through tubes 153 and exchange heat with the first heat exchange medium before passing into void space 160 and out into conduit 161. The first heat exchange medium will then pass into void space 162 and pass out through conduit 163.

As shown in FIGURE 19, the units 174 may include a drawn cup 176 having a flange 177 adapted to engage a header plate 178 or another drawn cup belonging to an adjacent unit 179. Again, extended portion 175 of tubes 173 is shown beyond pervious material 172.

In FIGURES 20 and 21, a multi-tube unit 204 is shown comprising two or more tubes 203 retained in spaced relationship by pervious material 202. These units 204 can be designed to conform to specific shapes. For example, they may conform to a tubular heat exchanger shell 205 due to appropriate shape of the edge portions of the units 206. If desired, the units 204 may be provided with extender portions 207 for header plate engagement as shown in FIGURE 21. Several units of this kind may then be arranged in an assembly generally in keeping with the before described embodiments. There is less tendency for by-pass in these assemblies inasmuch as there is a reduced number of gaps corresponding to each tube.

A variety of multi-tube units may be combined in a single assembly, as shown at 210, 211, 212, 213 and 214, some appropriately contoured to be in conformity with the shell 205. Such multi-tube units have the added advantage over single tube units of reducing the labor of assembly. Installations may be also designed to encompass a plurality of either single tube units 216 or multi-tube units 217, all within a given row. If desired, sealing members may be utilized between the units, as illustrated at 215. Some of the tubes such as tubes 203 in unit 212 may extend to the surface of the multi-tube unit.

It is to be understood that the invention is not limited to the illustrations described and shown herein, which are deemed to be merely illustrative of the best modes of carrying out the invention, and which are susceptible of modifications of form size, arrangement of parts and detail of operation. The invention is intended to encompass all such modifications which are within its spirit and scope, as set forth in the appended claims.

What is claimed is:

1. A heat exchange core comprising: a plurality of heat exchange units; said units comprising at least one tube conductively bonded to a layer of heat conducting, porous material; said porous material substantially completely covering said tubes; said units being in abutting relationship transverse to the flow through said porous material; and in at least a substantial portion of said core, means between each of said units for directing a heat exchange medium passing through said porous material toward said tubes.

2. A heat exchange core according to claim 1 in which the units in said core are arranged in a staggered relationship.

3. A heat exchange core according to claim 1 in which said tubes are completely surrounded by said heat conducting layer of porous material.

4. A heat exchange core according to claim 1 in which said tubes are circular.

5. A heat exchange core according to claim 1 in which said tubes are elliptical.

6. A heat exchange core according to claim 1 in which fin members are provided in at least some of said units.

7. A heat exchange core according to claim 1 in which said means are arranged in a staggered geometry.

8. A heat exchanger comprising: a hollow shell having an inlet and an outlet; a plurality of heat exchange units located within said shell; said units comprising at least one tube conductively bonded to a layer of heat conducting, porous material substantially completely covering said tubes; means for circulating a first heat exchange medium through said tubes; means for circulating second heat exchange medium into said inlet; through said porous layer and out through said outlet; said units being in abutting relationship transverse to the flow of said second heat exchange medium; and in at least a substantial portion of said heat exchanger, means between each of said units for directing said second heat exchange medium toward said tubes.

9. A heat exchanger according to claim 8 in which said units are arranged in a staggered geometry.

10. A heat exchanger according to claim 8 in which the units which are adjacent said hollow shell are contoured to fit snugly against said hollow shell.

11. A heat exchanger according to claim 8 in which the heat exchange units are nested.

12. A heat exchanger according to claim 8 in which fin material is provided in at least some of said units.

13. A heat exchanger according to claim 8 in which said means for directing said second heat exchange medium are arranged in a staggered geometry.

References Cited

UNITED STATES PATENTS

| 1,670,127 | 5/1928 | Stancliffe | 165—165 |
| 2,401,797 | 6/1946 | Rasmussen | 165—180 X |
| 2,448,315 | 8/1948 | Kunzog | 165—180 X |
| 3,262,190 | 7/1966 | Rostoker et al. | 29—157.3 |
| 3,306,353 | 2/1967 | Burne | 165—180 X |

FOREIGN PATENTS

| 1,313,183 | 11/1962 | France. |
| 285,151 | 2/1928 | Great Britain. |

ROBERT A. O'LEARY, *Primary Examiner.*

A. W. DAVIS, *Assistant Examiner.*

U.S. Cl. X.R.

165—180, 181; 29—157.3, 182.3